United States Patent
Klementowicz, III (10) Patent No.: US 8,583,490 B2
(45) Date of Patent: Nov. 12, 2013

(54) FRESHLY PREPARED FOOD DELIVERY METHODOLOGY

(76) Inventor: Nicholas Klementowicz, III, Hillsborough, NJ (US)

( * ) Notice: Subject to any disclaimer, the term of this patent is extended or adjusted under 35 U.S.C. 154(b) by 639 days.

(21) Appl. No.: 11/788,116

(22) Filed: Apr. 19, 2007

(65) Prior Publication Data

US 2008/0262934 A1 Oct. 23, 2008

(51) Int. Cl.
- G06Q 50/12 (2012.01)
- G06Q 20/20 (2012.01)
- G06Q 30/06 (2012.01)
- G06Q 30/02 (2012.01)

(52) U.S. Cl.
USPC ............. 705/15; 705/1.1; 705/26.9; 705/332; 705/333; 235/379; 235/380; 235/381; 235/382; 235/383; 379/111; 379/132; 186/38

(58) Field of Classification Search
USPC ......................................................... 705/15
See application file for complete search history.

(56) References Cited

U.S. PATENT DOCUMENTS

| | | | |
|---|---|---|---|
| 5,113,970 A * | 5/1992 | Bavis | 186/41 |
| 5,158,155 A * | 10/1992 | Domain et al. | 186/53 |
| 5,572,984 A | 11/1996 | Alden et al. | |
| 6,598,514 B2 | 7/2003 | Leggi | |
| 6,810,304 B1 * | 10/2004 | Dickson | 700/241 |
| 7,171,377 B2 | 1/2007 | Ogasawara | |
| 7,370,005 B1 * | 5/2008 | Ham et al. | 705/28 |
| 2004/0249497 A1 * | 12/2004 | Saigh et al. | 700/216 |
| 2006/0206395 A1 * | 9/2006 | Vallabh | 705/26 |
| 2007/0187183 A1 * | 8/2007 | Saigh et al. | 186/53 |

* cited by examiner

*Primary Examiner* — Fateh Obaid (74) *Attorney, Agent, or Firm* — Ernest D. Buff; Ernest D. Buff and Associates, LLC; Harry Anagnost (57) ABSTRACT

The present invention is a methodology for the delivery of freshly prepared food to a plurality of vehicle-operating consumers. Freshly prepared foods means foods that have, in some manner, recently been transformed into an edible or consumable format. Thus, when frozen ice cream is scooped into a cone, it is freshly prepared; when a frozen or cool item is microwaved to cook it or to merely heat it up, it is freshly prepared; when coffee is taken from an urn or coffeemaker and put into a cup, it is freshly prepared; when soda is dispensed from a dispenser or cooler, it is, in accordance with the present invention, freshly prepared; when frozen pizza is heated, it is freshly prepared, etc.

18 Claims, 6 Drawing Sheets

FRESHLY PREPARED FOOD DELIVERY METHODOLOGY

BACKGROUND OF INVENTION a. Field of Invention

The invention relates generally to present invention relates to systematic methodology for efficiently selling fast-food service products to vehicle-operating customers.

b. Description of Related Art

The following patents are representative of systems for the sale or delivery of goods to customers:

U.S. Pat. No. 7,171,377 to Nubuo Ogasawara describes a system to receive orders of merchandise such as merchandise sold in a supermarket from a large number of employees, for example, of a workplace, and to deliver the ordered merchandise in a bundle, thereby enhancing the employees' convenience and the efficiency of business. The system is provided with an order reception unit receiving an order of merchandise that can include perishable foods, a shopping list creating unit receiving one or more shopping lists corresponding to the orders from clients, a merchandise packing instruction unit receiving one or more shopping lists, and instructing picking and packing of the ordered merchandise corresponding to one or more clients to a packing worker, and a merchandise delivery unit delivering the packed merchandise to the delivery locations corresponding to one or more clients.

U.S. Pat. No. 6,598,514 B2 to Aurelio Leggi which comprises a kiosk that enables pasta portions of the type forming the classical Italian first course to be prepared, the kiosk including an automatic pasta cooking machine; a cooking hob for amalgamating within a suitable container, by heating accompanied by mixing, the required sauces or condiments with the pasta previously cooked in the pasta cooking machine; and a heating element for heating the sauces or condiments and/or for maintaining them hot.

U.S. Pat. No. 5,572,984 to Lorne B. Alden et al. shows a modular kiosk for use in the food service industry which is described. The kiosk includes one or more structural units having upstanding sides and back, and a horizontal roof with couplings on the back thereof for coupling appliances disposed in the unit to sources of energy. The unit typically would have metal, upper and lower sections, each receiving a different appliance for cooking or storing food. The unit can include a hood disposed at eye level and a griddle or deep fat fryer disposed below the hood in the middle section. When a hood is included, the hood is intended to be coupled to a flue. The device is intended to be used in malls and open areas for cooking and dispensing food.

Notwithstanding the prior art, the present invention is neither taught nor rendered obvious thereby.

SUMMARY OF INVENTION

The present invention is a methodology for the delivery of freshly prepared food to a plurality of vehicle-operating consumers. Freshly prepared foods means foods that have, in some manner, recently been transformed into an edible or consumable format. Thus, when frozen ice cream is scooped into a cone, it is freshly prepared; when a frozen or cool item is microwaved to cook it or to merely heat it up, it is freshly prepared; when coffee is taken from an urn or coffeemaker and put into a cup, it is freshly prepared; when soda is dispensed from a dispenser or cooler, it is, in accordance with the present invention, freshly prepared; when frozen pizza is heated, it is freshly prepared, etc.

The present invention methodology involves providing a physical delivery system at a single location that includes a main building for warehousing food supplies; a plurality of separate kiosk buildings, each kiosk building having at least one prepared food delivery window and each kiosk building having a motor vehicle lane with ingress and egress to the at least one prepared food delivery window; warehousing food supplies at the main building for subsequent preparation and sale to the plurality of vehicle-operating consumers; freshly preparing food from the food supplies at buildings selected from the group consisting of the main building, the plurality of kiosk buildings, and a combination thereof; and, selling the freshly prepared food to the plurality of vehicle-operating consumers at and through each of the at least one prepared food delivery windows at each of the plurality of kiosk buildings. In some preferred embodiments, the preparing step includes preparing at least one freshly prepared food selected from the group consisting of coffee, fast food meals, baked goods and ice cream.

In some preferred embodiments of the present invention methodology, each of the plurality of kiosk buildings are separated from one another by at least one the motor vehicle lane. In some preferred embodiments, the physical delivery system includes a main vehicle entrance that divides into at least one the motor vehicle lane for each kiosk building.

In some preferred embodiments of the present invention methodology, the main building further includes a restaurant with sit down table facilities.

In some preferred embodiments of the present invention methodology, each of the plurality of kiosk buildings includes computerized tracking of orders and payments and the methodology includes consolidating, tabulating and storing the computerized tracking at the main building by wired or wireless connection.

In some preferred embodiments, each of the plurality of kiosk buildings includes signaling means to indicate whether its kiosk building is open or closed for business.

In some preferred embodiments, each of the plurality kiosk buildings includes at least one food preparation means selected from the group consisting of a food warmer, a coffee maker, a microwave and a stove.

In some preferred embodiments of the present invention methodology, the main building includes packaged foods and freshly prepared foods for movement to the plurality of kiosk buildings.

In some preferred embodiments, the plurality of kiosk buildings are positioned at a plurality of egress areas from gasoline filling station pump areas.

In addition to the foregoing, the present invention methodology may be enhanced by the use of automatic and preferably computer controlled conveyance subsystems. Thus, the present invention methodology for the delivery of freshly prepared food to a plurality of vehicle-operating consumers, may comprise providing a physical delivery system at a single location that includes: a main building for warehousing food supplies; a plurality of separate kiosk buildings, each kiosk building having at least one prepared food delivery window and each kiosk building having a motor vehicle lane with ingress and egress to the at least one prepared food delivery window; a conveyance system having at least one conveyance means connected from the main building to the plurality of kiosk buildings for delivery of at least one product from the main building to the plurality of kiosk buildings, the at least one product being selected from the group consisting of food for fresh preparation at the plurality of kiosk buildings, freshly prepared food, and combinations thereof; warehousing food supplies at the main building for subsequent preparation and sale to the plurality of vehicle-operating consumers; freshly preparing food from the food supplies at buildings selected from the group consisting of the main building, the plurality of separate kiosk buildings, and a combination thereof; and, selling the freshly prepared food to the plurality of vehicle-operating consumers at and through each of the at least one prepared food delivery windows at each of the plurality of separate kiosk buildings. "Conveyance means" may be any mechanism for conveying prepared foods and/or other convenience store-type items from one building to another, and are typically one or more conveyor belts, but could be any known conveyance means, e.g. vacuum or air tubes or hanging containers in a loop or wheeled conveyors, machine or gravity drivers, etc.

In some preferred embodiments of the present invention methodology that utilizes the conveyance means, the preparing step includes preparing at least one freshly prepared food selected from the group consisting of coffee, fast food meals, baked goods and ice cream.

In some preferred embodiments of the present invention methodology that utilizes the conveyance means, each of the plurality of kiosk buildings are separated from one another by at least one the motor vehicle lane.

In some preferred embodiments of the present invention methodology that utilizes the conveyance means, the physical delivery system includes a main vehicle entrance that divides into at least one the motor vehicle lane for each kiosk building.

In some preferred embodiments of the present invention methodology that utilizes the conveyance means, the main building further includes a restaurant with sit down table facilities. In some preferred embodiments each of the plurality of kiosk buildings includes computerized tracking of orders and payments and the methodology includes consolidating, tabulating and storing the computerized tracking at the main building by wired or wireless connection.

In some preferred embodiments of the present invention methodology that utilizes the conveyance means, each of the plurality of kiosk buildings includes signaling means to indicate whether its kiosk building is open or closed for business.

In some preferred embodiments of the present invention methodology that utilizes the conveyance means, each of the plurality of kiosk buildings includes at least one food preparation means selected from the group consisting of a food warmer, a coffee maker, a microwave and a stove.

In some preferred embodiments of the present invention methodology that utilizes the conveyance means, the main building includes packaged foods and freshly prepared foods for movement to the plurality of kiosk buildings.

In some preferred embodiments of the present invention methodology that utilizes the conveyance means, the plurality of kiosk buildings are positioned at a plurality of egress areas from gasoline filling station pump areas.

The present invention methodology may be further enhanced by computer controls. Thus, the present invention methodology for the delivery of freshly prepared food to a plurality of vehicle-operating consumers, may comprise providing a physical delivery system at a single location that includes: a main building for warehousing food supplies; a plurality of separate kiosk buildings, each kiosk building having at least one prepared food delivery window and each kiosk building having a motor vehicle lane with ingress and egress to the at least one prepared food delivery window; a conveyance system having at least one conveyance means connected from the main building to the plurality of kiosk buildings for delivery of at least one product from the main building to the plurality of kiosk buildings, the at least one product being selected from the group consisting of food for fresh preparation at the plurality of kiosk buildings, freshly prepared food, and combinations thereof; a computerized central control system having a central computer located at the main building and satellite computer components located at each of the plurality of kiosk buildings, the control system having means to respond to an automatic ordering and purchasing device located at each of the plurality of kiosk buildings by confirming order inputs and order payments and by presenting orders for fulfillment at the main building and, upon command, conveying filled orders to corresponding the plurality of kiosk buildings and dispensing the orders to vehicle-operating consumers; a plurality of automatic ordering and purchasing devices, at least one the automatic ordering and purchasing device located at each of the plurality of kiosk buildings to permit vehicle-operating consumers to automatically order and pay for freshly prepared food; warehousing food supplies at the main building for subsequent preparation and sale to the plurality of vehicle-operating consumers; freshly preparing food from the food supplies at buildings selected from the group consisting of the main building, the plurality of separate kiosk buildings, and a combination thereof; and, selling the freshly prepared food to the plurality of vehicle-operating consumers at and through each of the at least one prepared food delivery windows via the automatic ordering and purchasing device at each of the plurality of separate kiosk buildings.

In some preferred embodiments of the present invention methodology that utilizes the conveyance means and the computer controls mentioned above, the preparing step includes preparing at least one freshly prepared food selected from the group consisting of coffee, fast food meals, baked goods and ice cream.

In some preferred embodiments of the present invention methodology that utilizes the conveyance means and the computer controls mentioned above, each of the plurality of kiosk buildings are separated from one another by at least one the motor vehicle lane.

In some preferred embodiments of the present invention methodology that utilizes the conveyance means and the computer controls mentioned above, the physical delivery system includes a main vehicle entrance that divides into at least one the motor vehicle lane for each of the plurality of kiosk buildings.

In some preferred embodiments of the present invention methodology that utilizes the conveyance means and the computer controls mentioned above, the main building further includes a restaurant with sit down table facilities.

In some preferred embodiments of the present invention methodology that utilizes the conveyance means and the computer controls mentioned above, each of the plurality of kiosk buildings includes computerized tracking of orders and payments and the methodology includes consolidating, tabulating and storing the computerized tracking at the main building by wired or wireless connection.

In some preferred embodiments of the present invention methodology that utilizes the conveyance means and the computer controls mentioned above, each of the plurality of kiosk buildings includes signaling means to indicate whether its the kiosk building is open or closed for business.

In some preferred embodiments of the present invention methodology that utilizes the conveyance means and the computer controls mentioned above, each of the plurality of kiosk buildings includes at least one food preparation means selected from the group consisting of a food warmer, a coffee maker, a microwave and a cooking device.

In some preferred embodiments of the present invention methodology that utilizes the conveyance means and the computer controls mentioned above, the main building includes packaged foods and freshly prepared foods for movement to the plurality of kiosk buildings.

In some preferred embodiments of the present invention methodology that utilizes the conveyance means and the computer controls mentioned above, the plurality of kiosk buildings are positioned at a plurality of egress areas from gasoline filling station pump areas.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE EMBODIMENTS

Figure 1:
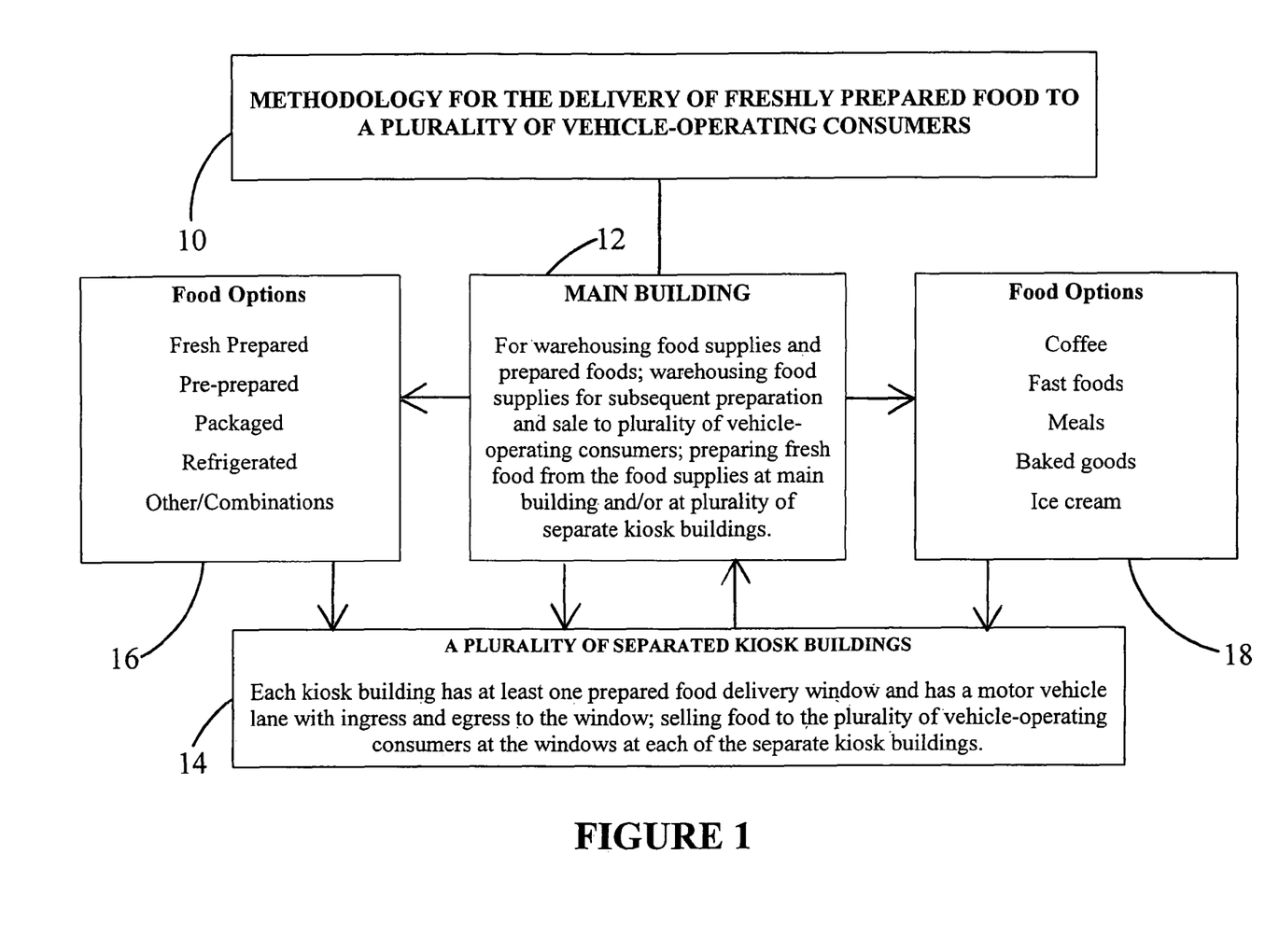
FIG. 1 is a block diagram view of some preferred embodiments of the present invention methodology for delivering food to vehicle-operating consumers.

FIG. 1 is a block diagram view of some preferred embodiments of the present invention methodology for delivering food to vehicle-operating consumers 10. Main building 12 is for warehousing food supplies and prepared foods; warehousing food supplies for subsequent preparation and sale to plurality of vehicle operating consumers; preparing fresh food from the food supplies at main building and/or at plurality of separate kiosk buildings. Food options 16 from main building 12 to the plurality of separated kiosk buildings 14 includes fresh prepared, pre-prepared, packaged, refrigerated, other and combinations thereof. Examples of these food options 18 include coffee, fast foods, full meals, baked goods, ice cream, etc. Each kiosk building 14 has at least one prepared food delivery window and has a motor vehicle lane with ingress and egress to the window; selling food to the plurality of vehicle-operating consumers at the windows at each of the separate kiosk building.

Figure 2:
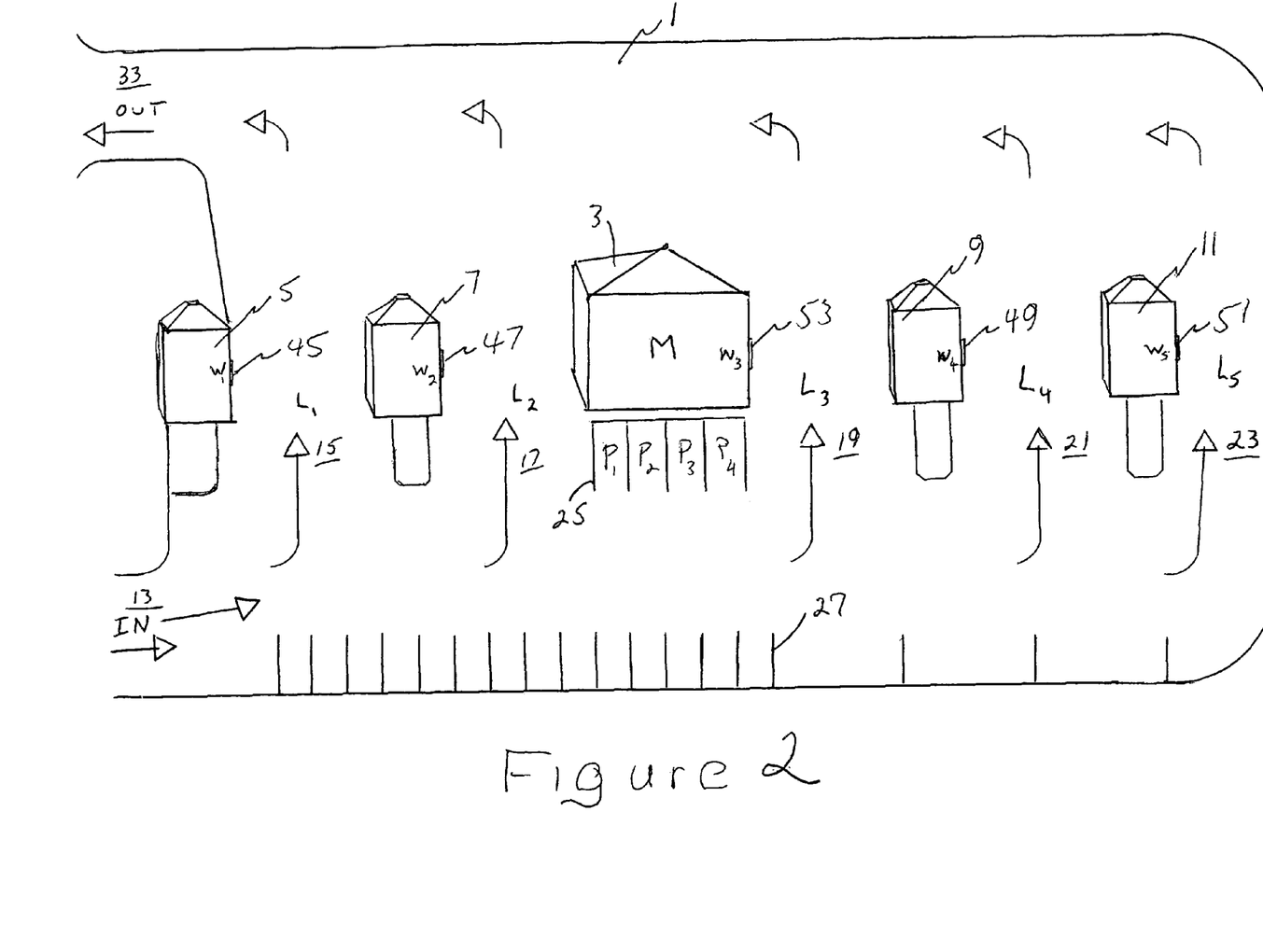
FIG. 2 is a stylized front oblique view of one preferred embodiment of the present invention methodology for delivering food to vehicle-operating consumers.

FIG. 2 is a stylized front oblique view of one preferred embodiment of the present invention methodology 1 for delivering food to vehicle-operating consumers. There's a main building 3 that includes the functionalities set forth in FIG. 1 and may also serve as a computer control center, as a conveyance control center and as a walk-in take-out and/or sit-down restaurant. It has a drive up window 53 in lane L3 at lane ingress 19 for drive through service. There are parking spaces 25 at main building 3 as well as spaces 27 along the front of the parking lot. There is a plurality of separate kiosk buildings 5, 7, 9 and 11, with drive up windows 45, 47, 49 and 51. They respectively have drive through service lanes, L1, L2, L4 and L5, with lane ingresses 15, 17, 21 and 23. There's a main ingress 13 that is a one-way entrance and a main egress 33 that is a one-way exit. Food may periodically be delivered from main building 3 to the various kiosks manually or by underground conveyances or both.

Figure 3:
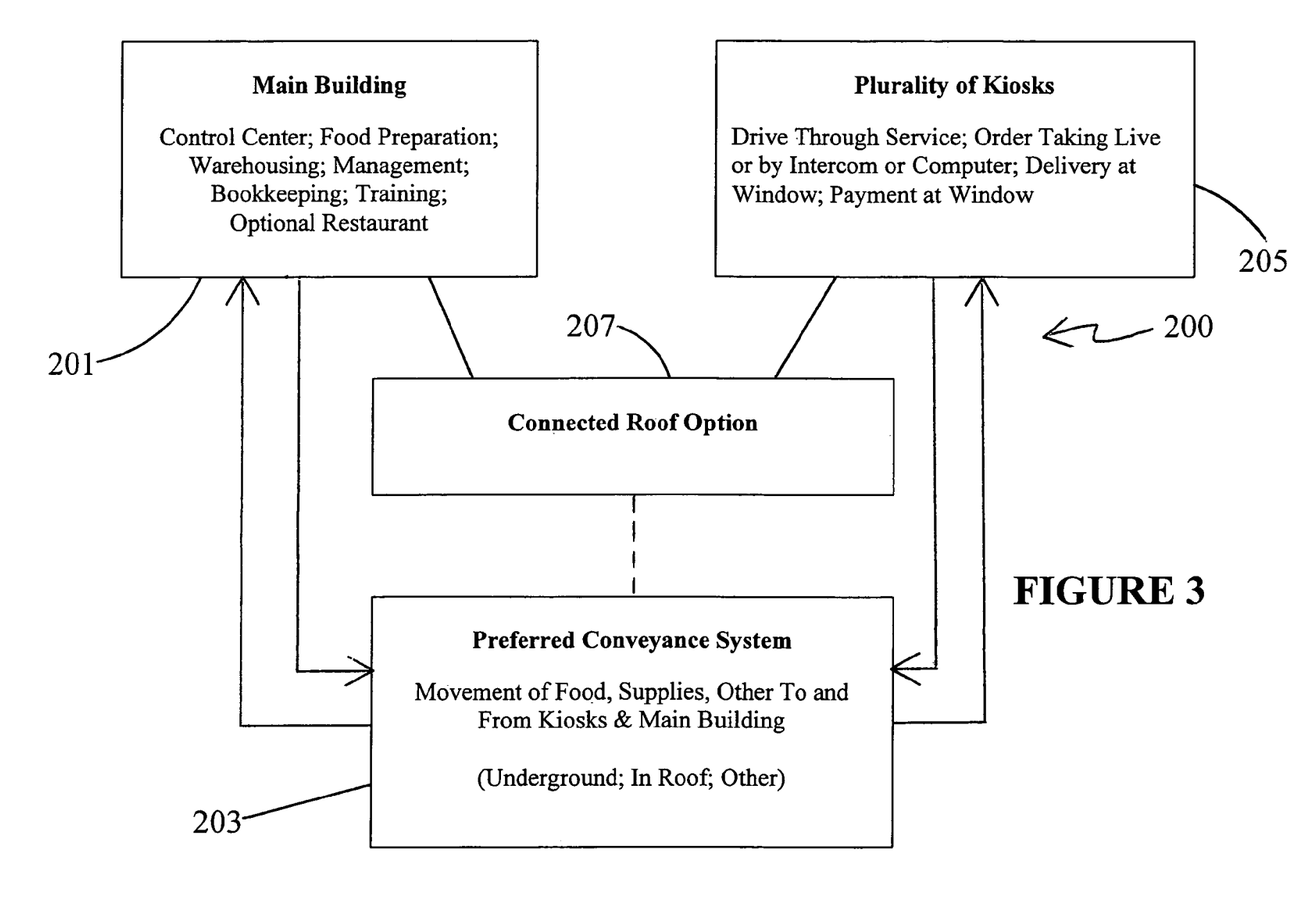
FIG. 3 is a block diagram view of some other preferred embodiments of the present invention methodology for delivering food to vehicle-operating consumers, including a common roof option with conveyance mechanisms.
Figure 4:
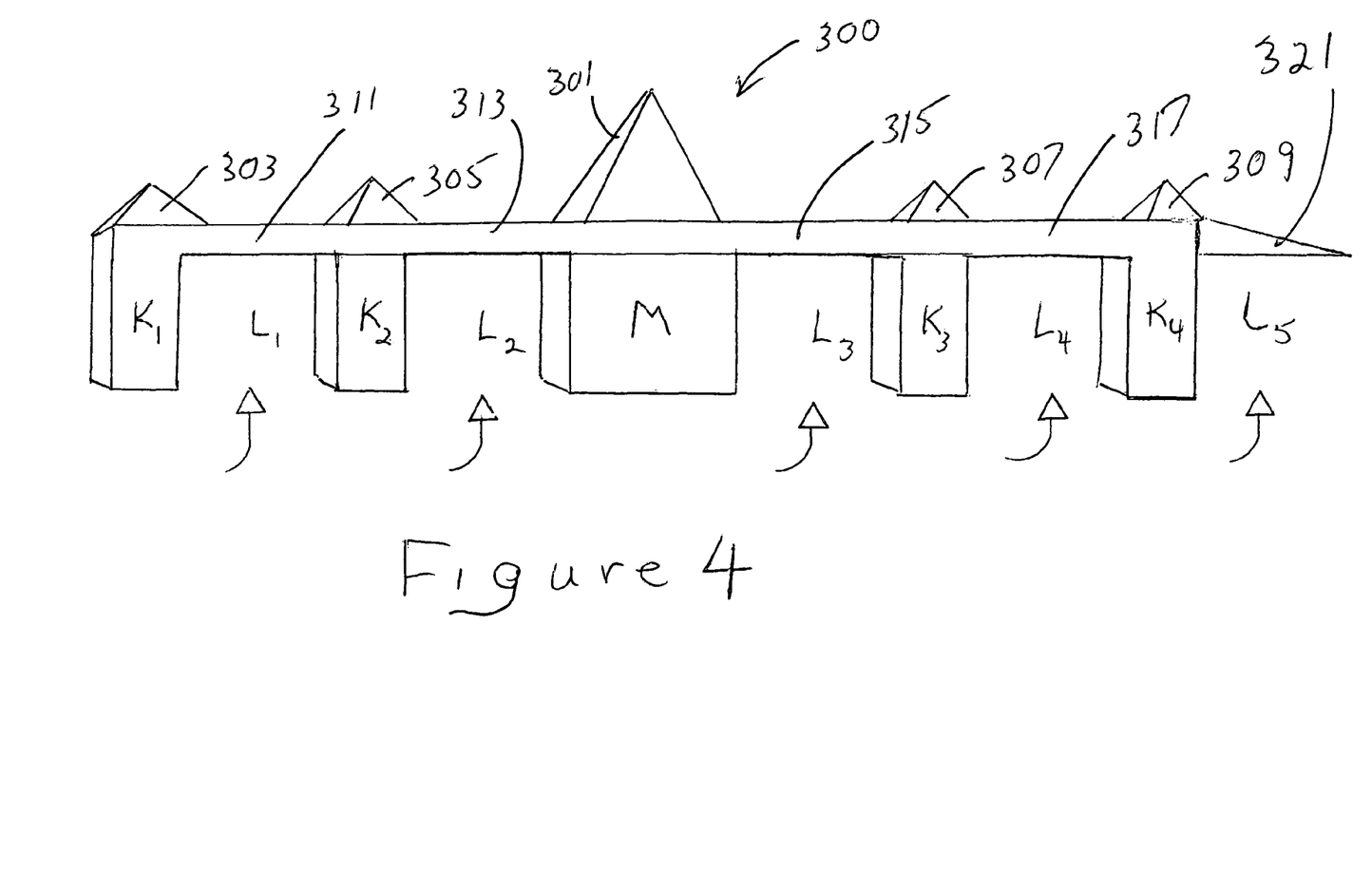
FIG. 4 is a stylized front oblique view of another preferred embodiment of the present invention methodology for delivering food to vehicle-operating consumers.

FIG. 3 is a block diagram view of some other preferred embodiments of the present invention methodology 200 for delivering food to vehicle-operating consumers, including a common roof option 207 with conveyance mechanisms shown as a preferred conveyance system 203 for movement of food, supplies, other to and from kiosks 205 and main building 201. The conveyance system 203 may be underground or within a common roof structure or otherwise, for example, if the main building is significantly higher than the kiosks, conveyance systems could be within sloped building arms or tubes. The plurality of the kiosks 205 could be with live employees and orders could be taken manually by employees or by intercom to the main building 201 or by computer with speakers and voice recognition systems FIG. 4 is a stylized front oblique view of another preferred embodiment of the present invention methodology 300 for delivering food to vehicle-operating consumers. Main building 301 has the same functionalities as any of the main buildings above and kiosks 303, 305, 307 and 309 are connected to main building 301 with seperating lanes L1, L2, L3, L4, L5 and by roof sections 311, 313, 315 and 317 with overhang 321 for lane 5. The roof sections described may or may not include conveyances such as those described above and below.

Figure 5:
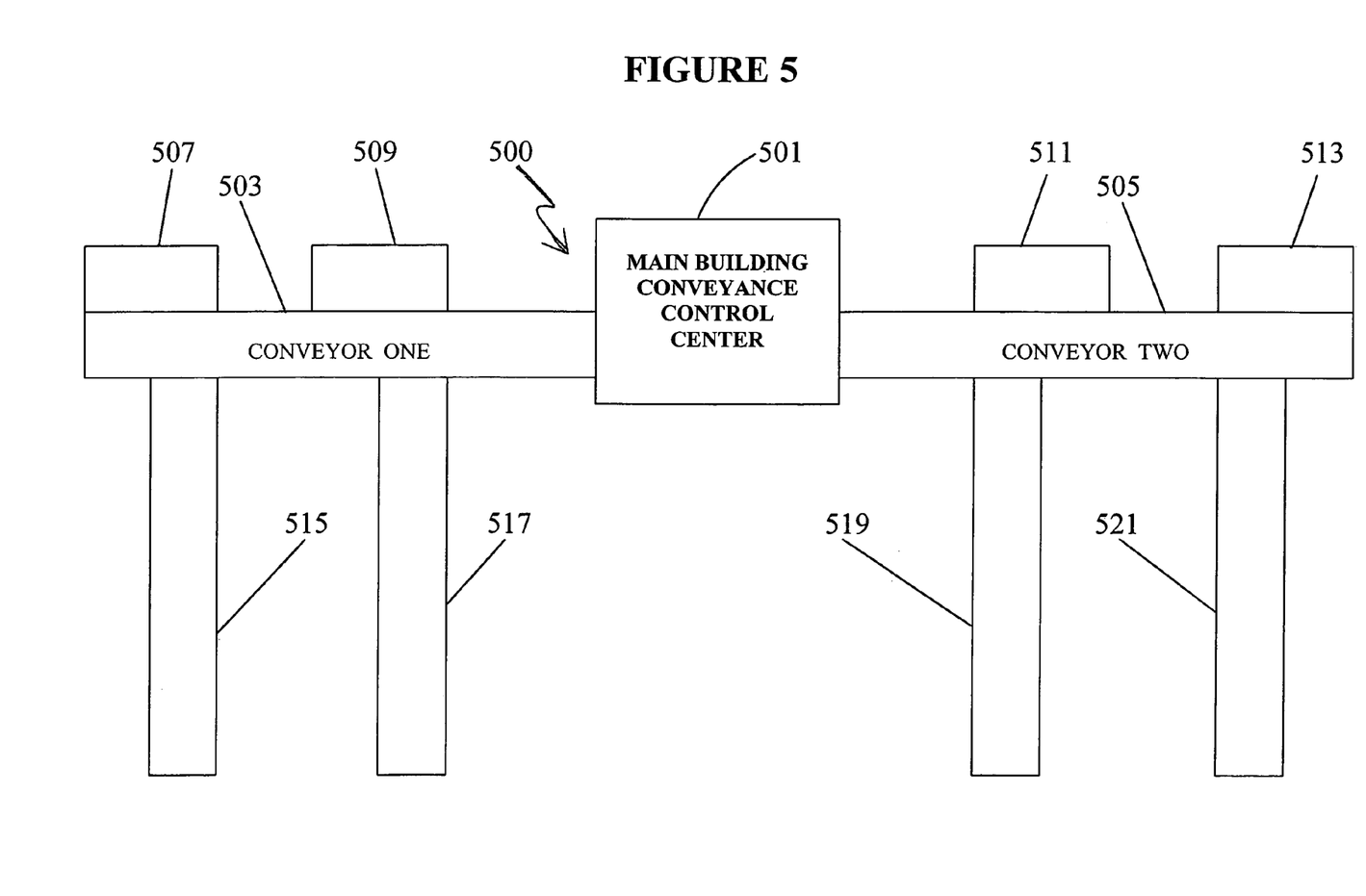
FIG. 5 is a block diagram view of some other preferred embodiments of the present invention methodology for delivering food to vehicle-operating consumers, including horizontal conveyances from the main building and vertical conveyance mechanisms within the kiosks.

FIG. 5 is a block diagram view of some other preferred embodiments of the present invention methodology 500 for delivering food to vehicle-operating consumers, including horizontal conveyances from the main building and vertical conveyance mechanisms within the kiosks. Main building conveyance control sector 501 is connected to conveyors 503 and 505. Conveyor 503 moves food goods and other materials to kiosks represented by blocks 515 and 517. Vertical dumbweighters or other vertical conveyances are contained within each of kiosks 515, 517, 519 and 521. Conveyance controllers 507, 509, 511 and 513 have synchronized, controlled capabilities to move items from conveyor 503 or conveyor 505 to and from the dumbweighters in kiosks 515, 517, 519 and 521.

Figure 6:
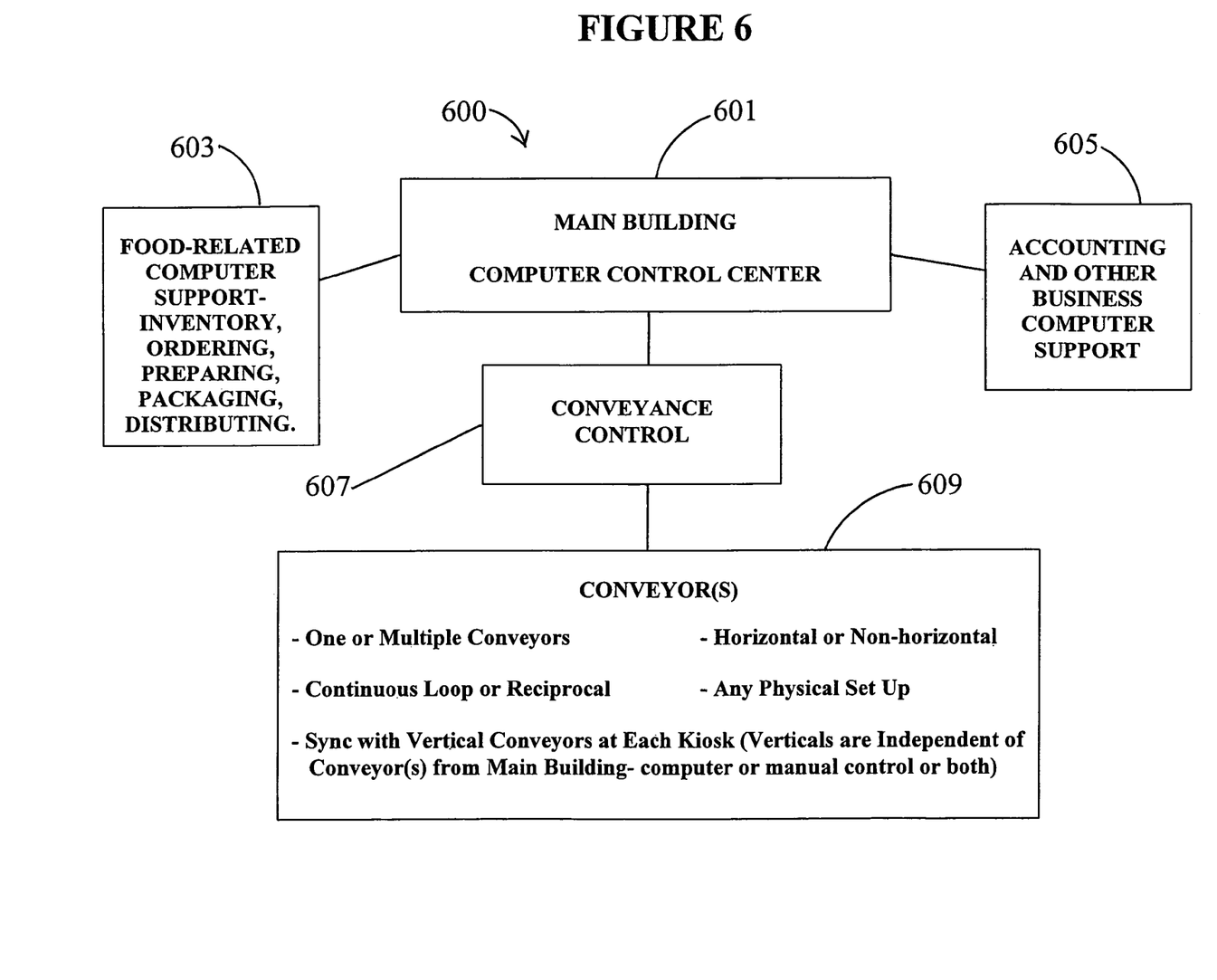
FIG. 6 is a block view of some other preferred embodiments of the present invention methodology for delivering food to vehicle-operating consumers, particularly illustrating the computer control center of such methodologies.

FIG. 6 is a block view of some other preferred embodiments of the present invention methodology 600 for delivering food to vehicle-operating consumers, particularly illustrating the computer control center of such methodologies. Main building computer control system 601 includes food-related computer support-inventory, ordering, preparing, packaging, distributing 603 and accounting and other business computer support 605. Conveyance control 607 controls conveyors 609. This may be one or multiple conveyors; continuous loop or reciprocal; sync with vertical conveyors at each kiosk (verticals are independent of conveyor(s) from main building-computer or manual control or both); horizontal or non-horizontal; any physical set up.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims. For example, the present invention methodology is primarily directed to the sale of food products to vehicle-operating customers, but ancillary sales of non-food products is anticipated in many embodiments. Thus, cigarettes, newspapers, alcohol and other convenience store products could be included.

What is claimed is:

1. A method for the delivery of freshly prepared food to one or more vehicle-operating consumers, which comprises the steps of:
   (a) providing a physical delivery system at a single location that includes:
      (i) a main building for warehousing food supplies and for preparation of freshly prepared food;
      (ii) a plurality of separate kiosk buildings, separate from each other and from said main building, each kiosk building having at least one food delivery window and each kiosk building having a motor vehicle lane with ingress and egress to said one prepared food delivery window; and
      (iii) each of said plurality of kiosk buildings are separated from one another by at least one said motor vehicle lane;
   (b) warehousing food supplies at said main building for subsequent preparation and sale to one or more of said vehicle-operating consumers;
   (c) freshly preparing food from said food supplies at buildings selected from the group consisting of said main building, said main building and said plurality of kiosk buildings, and a combination thereof;
   (d) delivering at least one of said food supplies and said freshly prepared food to said kiosks manually;
   (e) selling said freshly prepared food to at least one of said plurality of vehicle-operating consumers via any number of said food delivery windows located at each of said plurality of kiosk buildings;
   (f) each of said plurality of kiosk buildings includes computerized tracking of orders and payments and said methodology includes consolidating, tabulating and storing said computerized tracking at said main building by wired or wireless connection;
   (g) said physical delivery system includes a main vehicle entrance that divides into at least one said motor vehicle lane for each kiosk building; and
   (h) said kiosk buildings are positioned at a plurality of egress areas from gasoline filling station pump areas.

2. The method as defined by claim 1 wherein said preparing step includes preparing at least one freshly prepared food selected from the group consisting of hot beverages, and cold beverages, fast food meals, baked goods and ice cream.

3. The method as defined by claim 1 wherein said main building further includes a restaurant with sit down table facilities.

4. The method as defined by claim 1 wherein each of said plurality of kiosk buildings includes a signaling means to indicate whether the corresponding kiosk building is open or closed for business.

5. The method as defined by claim 1 wherein each of said plurality of kiosk buildings is manned with at least one server and includes at least one food preparation means selected from the group consisting of a food warmer, a coffee maker, a microwave and a stove.

6. The method as defined by claim 1 wherein said main building includes packaged foods and freshly prepared foods for manual movement to one or more of said plurality of kiosk buildings.

7. A method for the delivery of freshly prepared food to one or more vehicle-operating consumers, which comprises the steps of:
   (a) providing a physical delivery system at a single location that includes:
      (i) a main building for warehousing food supplies for preparation of freshly prepared food and;
      (ii) a plurality of separate kiosk buildings, with each kiosk building having at least one food delivery window and each kiosk building having a motor vehicle lane with ingress and egress to said at least one prepared food delivery window;
      (iii) providing a conveyance system having at least one conveyance means connected from said main building to said plurality of kiosk buildings for delivery of at least one product from said main building to said plurality of kiosk buildings, said at least one product being selected from the group consisting of food for fresh preparation at said plurality of kiosk buildings, freshly prepared food, and combinations thereof, and said conveyance system being selected from the group consisting of an overhead conveyance system that vehicles may drive under, an underground conveyance system that vehicles may drive over, and combinations thereof;
      (iv) providing automatic ordering and purchasing devices, at least one of said automatic ordering and purchasing devices being located each of said kiosk buildings to permit vehicle-operating consumers to order and pay for freshly prepared food;
      (v) a computerized central control system having a central computer located at said main building and satellite computer components located at each of said plurality of kiosk buildings, wherein said control system has a means to respond to an said automatic ordering and purchasing device located at each of said plurality of kiosk buildings, by confirming order inputs and order payments and by presenting orders for fulfillment at said main building and, upon command, conveying filled orders to said kiosk building from where the order was placed and dispensing said orders to said vehicle-operating consumer that placed the order;
      (vi) said plurality of kiosk buildings are separated from one another by at least one said motor vehicle lane;
   (b) warehousing food supplies at said main building for subsequent preparation and sale to said plurality of vehicle-operating consumers;
   (c) freshly preparing food from said food supplies at buildings selected from the group consisting of said main building, said plurality of kiosk buildings, and a combination thereof;
   (d) selling said freshly prepared food to one or more of said plurality of vehicle-operating consumers via each of said food delivery windows via said automatic ordering and purchasing devices located at each of said plurality of kiosk buildings;
   (e) each of said plurality of kiosk buildings includes computerized tracking of orders and payments and consolidating, tabulating and storing said computerized tracking at said main building by wired or wireless connection;
(f) said physical delivery system includes a main vehicle entrance that divides into at least one said motor vehicle lane for each kiosk building; and
(g) said kiosk buildings are positioned at a plurality of egress areas from gasoline filling station pump areas.

8. The method as defined by claim 7 wherein said preparing step includes preparing at least one freshly prepared food selected from the group consisting of coffee, fast food meals, baked goods and ice cream.

9. The method as defined by claim 7 wherein said main building further includes a restaurant with sit down table facilities.

10. The method as defined by claim 7 wherein each of said plurality of kiosk buildings includes a signaling means to indicate whether its said kiosk building is open or closed for business.

11. The method as defined by claim 7 wherein each of said plurality of kiosk buildings includes at least one food preparation means selected from the group consisting of a food warmer, a coffee maker, a microwave and a cooking device.

12. The method as defined by claim 7 wherein said main building includes packaged foods and freshly prepared foods for movement to said plurality of kiosk buildings.

13. The method as defined by claim 1, wherein said warehousing further comprises warehousing convenience-store items at said main building, said delivering further comprises delivery of at least one said convenience-store item to said kiosks, and said selling further comprises sale of said at least one convenience-store item to at least one of said plurality of vehicle-operating consumers via any number of said food delivery windows.

14. The method as defined by claim 13, wherein said convenience-store items include at least one item selected from the group consisting of cigarettes, newspapers, and alcohol.

15. The method as defined by claim 7, wherein said warehousing further comprises warehousing convenience-store items at said main building, said conveyance means further provides for delivery of at least one said convenience-store item from said main building to said plurality of kiosk buildings, said automatic ordering and purchasing devices further permits said customers to order and pay for said at least one said convenience-store item, and said selling further comprises sale of said at least one convenience-store item to at least one of said plurality of vehicle-operating consumers via any number of said food delivery windows.

16. The method as defined by claim 15, wherein said convenience-store items include at least one item selected from the group consisting of cigarettes, newspapers, and alcohol.

17. A method for the delivery of convenience store items to one or more vehicle-operating consumers, which comprises the steps of
(a) providing a physical delivery system at a single location that includes:
    (i) a main building for warehousing non-food products, including convenience store items;
    (ii) a plurality of separate kiosk buildings, separate from each other and from said main building, each kiosk building having at least one delivery window and each kiosk building having a motor vehicle lane with ingress and egress to said one delivery window; and
    (iii) said plurality of kiosk buildings are separated from one another by at least one said motor vehicle lane;
(b) warehousing supplies that include said convenience items at said main building for subsequent preparation and sale to one or more of said vehicle-operating consumers;
(c) selecting convenience store items from said supplies at buildings selected from the group consisting of said one main building, said main building and said plurality of kiosk buildings, and combinations thereof;
(d) delivering at least one of said convenience store items to said kiosks manually,
(e) selling said at least one of said convenience store items to at least one of said vehicle-operating consumers via any number of said delivery windows located at each of said plurality of kiosk buildings;
(f) each of said plurality of kiosk buildings includes computerized tracking of orders and payments and consolidating, tabulating and storing said computerized tracking at said main building by wired or wireless connection;
(g) said physical delivery system includes a main vehicle entrance that divides into at least one said motor vehicle lane for each kiosk building; and
(h) said kiosk buildings are positioned at a plurality of cress areas from gasoline filling station pump areas.

18. The method for the delivery of convenience store items to one or more vehicle-operating consumers, as defined by claim 17, wherein said non-food products include at least one convenience store item selected from the group consisting of cigarettes, newspapers, and alcohol.

* * * * *